Nov. 24, 1959  J. E. WITZKY ET AL  2,914,295
RELIEF VALVE
Filed Sept. 10, 1954
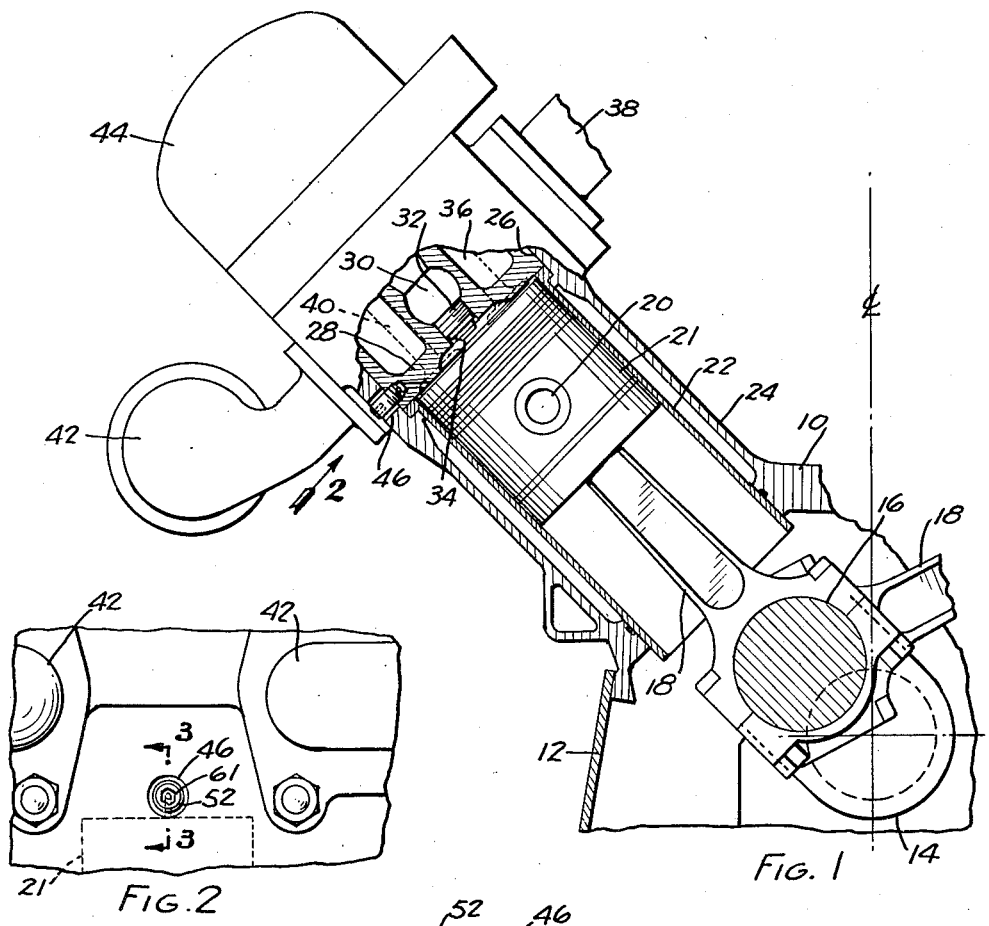
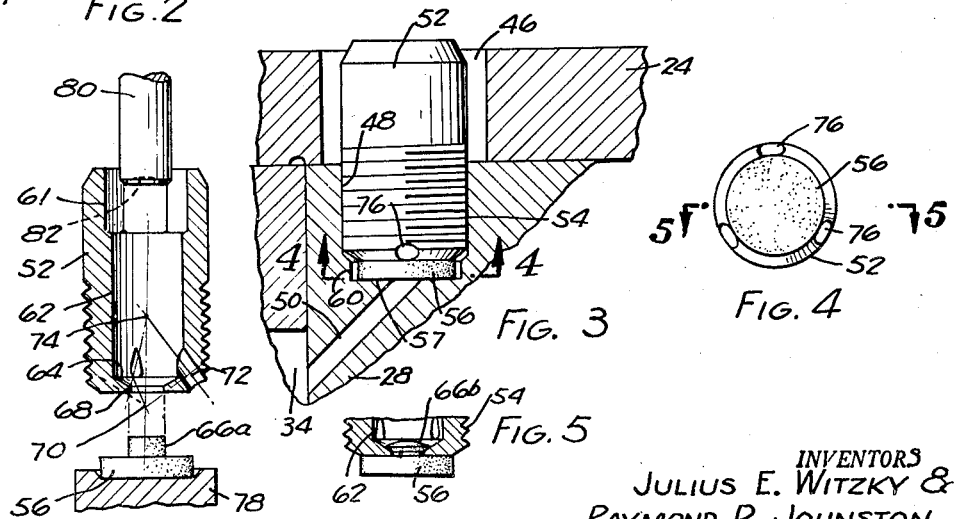
INVENTORS
JULIUS E. WITZKY &
RAYMOND R. JOHNSTON
BY Wilson, Redrow, and Gaines
ATTORNEYS.

United States Patent Office 2,914,295
Patented Nov. 24, 1959

2,914,295

RELIEF VALVE

Julius E. Witzky, Royal Oak, and Raymond R. Johnston, Detroit, Mich., assignors to Studebaker-Packard Corporation, a corporation of Michigan Application September 10, 1954, Serial No. 455,314

4 Claims. (Cl. 251—216)

The present application relates to an integrated bipartite relief or venting valve for engine cylinders, particularly to a unitary relief valve for controllably bleeding off and relieving excessive engine cylinder pressures during engine cranking and being so fabricated as to present a soft-metal sealing surface effective to positively seal off and discontinue the pressure bleeding during normal engine running and otherwise as desired.

An object of the present invention is the provision of a two-part unitary valve having a hollow body part open at both ends and a solid metal seal part at one end of the body part which is constructed and arranged so as to leave open at least a portion of the hollow part at that end for the introduction of gases in a stream through the interior of the hollow part.

A further object is the provision of a valve of two parts consisting of a hollow body part and solid metal seal part as defined in the preceding object, wherein the hollow part is made of steel and the solid metal seal part abuts therewith and is made of soft copper.

Another object of the invention is the provision of open ended hollow steel and solid copper seal parts abutting to form a valve as defined in the preceding object, wherein a plurality of openings is provided at the one end of the hollow steel part at which the copper seal is located, and wherein the seal has an integral copper stud peened to and solidly carried by one opening in the said one end of the hollow steel part in a manner such as to leave free the other openings at that end.

Another object of the invention is to provide a valve having a hollow body piece tapering at one end to an external apex therebeyond and having a family of passages at that end with their axes conforming to a conical path of revolution converging to oppositely disposed apex within the hollow interior of the valve with which the passage communicates.

A further object of the invention is the provision of a passage-incorporating, hollow body piece for a valve which conically tapers adjacent the passage incorporating end thereof as defined in the preceding object, wherein an internal socket is formed within the conically tapered end of the body piece and wherein a stud integrally incorporated by a sealing piece is received through an opening in the bottom of the socket and peened over within the confines of the socket so as not to interfere with the free communication between the end passages and the hollow interior of the body piece.

Further features, objects and advantages will either be specifically pointed out or become apparent when, for a better understanding of the invention, reference is made to the following written description taken in conjunction with the accompanying drawings in which:

Figure 1 shows an illustrative V-8 engine embodying the presently disclosed novel relief valve;

Figure 2 is a view of the side of the engine taken in a direction of the arrow 2 in Figure 1;

Figure 3 is a side elevation of the relief valve taken along the lines 3—3 in Figure 2;

Figure 4 is an end view of the valve taken along the section lines 4—4 of Figure 3;

Figure 5 is a longitudinal section view of the valve taken along the lines 5—5 of Figure 4; and Figure 6 is a longitudinal cross sectional showing of the valve during the fabrication and assembly thereof.

In the drawing, a 90° V-type 8 cylinder diesel engine is shown having a block 10 closed at the bottom thereof by means of an oil pan 12 which cooperates therewith to define an engine crank case in which a multi-throw crank shaft 14 is rotatably suspended from a set of appropriate bearings, not shown, mounted to the underside of the block 10. The multi-throw crankshaft 14 includes, among other throws, an illustrative throw journal 16 common to the inner end bearings of a pair of angularly related piston rods 18 each of which is connected at its outer end as by means of a piston pin 20 to a reciprocating piston 21. Each of the pistons 21 is slidably related to and reciprocates within a wet type cylinder liner 22 defining a surrounding water jacket jointly with an engine cylinder 24 disposed in one of the two banks of cylinders integral with the block 10, said banks defining a 90° V whose vertex is on the longitudinal center line of the engine and the block 10. Each of the cylinders 24 has an upwardly extending outer end in which a counterbored internal mouth 26 is formed to receive an individual internally passaged cylinder head 28 which clamps an upper flanged end of the wet liner 22 to the step of the counterbore. The internally passaged individual cylinder head 28 contains circulating cooling water and incorporates a centrally located spherical pre-combustion chamber 30 which is bathed externally in the cooling water and which internally conducts sprayed particles of fuel downwardly therethrough from a depending injector nozzle into an externally threaded discharge jet element 32 defining an internal communicating passage or passages for introducing the sprayed combustible mixture in a jet into a main combustion chamber 34 within the cylinder liner 22 between the head 28 at the top of the chamber and the head of the piston 21 at the bottom. Each of the internally passaged cylinder heads 28 includes a plurality of exhaust valves 36 preferably two in number which control the discharge of engine exhaust gases into an exhaust manifold 38 included in the V of the engine. A similar number of intake valves 40, two in this instance, is also provided in each of the individual heads 28 for controlling the introduction of cylinder intake air from an intake manifold 42 which is preferably supercharged. The intake manifold 42 may have a pair of branches one for each of the intake-passage-controlling pair of intake valves 40 for each cylinder.

A valve cage cover 44 may be mounted atop the cylinder heads 28 in common to all cylinders in a given bank of the V engine. Adjacent the stepped point of counterbore in the mouth thereof for receiving the cylinder liner 22 and the head 28, each of the outer ends of the cylinders 24 may be formed with a transverse access opening 46 of a diameter somewhat larger than and concentric with the largest diameter portion of a registering threaded valve receiving socket 48 formed in the side of the head 28 and forming the mouth of a cylinder pressure bleed or relief passage 50 diagonally formed within the head 28 so as to communicate directly with the top end of the main combustion chamber 34. An externally threaded relief valve or plug 52 has an externally threaded lower portion 54 whereby the valve is threadably received in the threads of the threaded socket 48. The valve 52 is of bipartite construction of which a hollow sleeve forms the body part thereof and a solid disk preferably of soft copper at 56 is carried thereby adjacent its lower threaded end portion 54. The soft copper disk 56 sealingly engages a smooth floor 57 provided at the bottom of the threaded mouth or socket 48 and has an external diameter of lesser magnitude than the inside diameter of the periphery of the floor 57 so as to provide a lateral annular clearance space 60 therebetween. Retraction of the bipartite valve 52 a slightly distance upwardly in the threads of the socket 48 permits the copper sealing disk 56 to unseat or withdraw from the floor 57 of the socket and establish communication through the annular space 60 between the bleed passage 50 and the lower threaded end portion 54 of the hollow part of the valve 52. Compression gases are thus bled off from the main combustion chamber 34 during the engine cranking operation to facilitate the same in well known manner as set forth in the expired U.S. Patent No. 790,764 for instance and elsewhere.

The hollow body part of the valve 52 is preferably formed of steel having rigid threads as at 54 which mate satisfactorily without wearing with the threads formed in the threaded socket mouth 48 in the head 28 which also is made preferably of steel, or a hard alloy. At its upper or non-threaded outer end, the hollow body part of the valve 52 is smooth and externally conically tapered and formed internally with a counter-bored, stepped tool receiving socket of polygonal shape at 61 which is preferably hexagonal and which communicates with the relatively reduced cylindrically walled hollow interior thereof indicated at 62. The hexagonal socket 61 is especially adapted to receive the end of a bent hexagonal bar known in the trade as an Allen wrench and by means of which the valve 52 may be rotated in its threads and manually opened to bleed off excess engine cylinder pressures outwardly through the socket 61 during engine cranking and otherwise as desired. At its opposite lower end 54 adjacent the external threads thereof, the hollow body part of the valve 52 is conically tapered both externally and also internally to define a conical internal stud receiving socket 64 for an integral upstanding stud formed on and carried by the solid copper sealing disk 56. The upstanding stud, initially a right cylinder as shown at 66a in Figure 6 is received within an opening 68 formed in the floor of the resulting frusto conical socket 64 and is peened over in the latter so as to be foreshortened and rounded off as at 66b, Figure 5, strictly within the axial confines of the frusto conical socket 64.

The conically tapering lower end of the valve 52 is generated according to a conical path of revolution converging at an apex 70 along the longitudinal valve axis at a point externally behind the end of the valve 52. A plurality of passages 72, preferably three in number as shown, is formed in the lower end of the hollow piece of the valve 52 according to another conical path of revolution whose apex is located along the same valve axis but oppositely disposed to the apex 70 so as to be located within the confines of the hollow interior 62 of the valve 52 at a point 74. The passages 72 freely continuously communicate at their inner ends with the hollow interior 62 of the valve and their outer ends or mouths conform to a circular path of revolution of a diameter greater than the outside diameter of the copper disk 56 and greater than the small diameter of the externally conically reduced portion of the lower or threaded end portion 54 of the valve 52. The passage mouths 76 thereby continually communicate freely with the annular clearance gap 60 at all times regardless of the position of the valve 52 in the threads of the threaded socket 48 and the degree of communication is somewhat increased when the valve 52 is retracted upwardly in the thread of the socket 48 so as to separate the soft copper seal 56 from its engagement with the floor 57 of the valve receiving socket 48. Not only do the mouths 76 of the passage 72 freely communicate with the annular space 60 as just described but also the inner ends of the passage 72 freely communicate with the hollowed interior 62 of the valve 52 without any interference of the peenable stud 66a after it is peened into the unprotruding depressed position 66b, Figure 5, within the axial confines of the frusto-conical internal socket 64 of the hollow body piece of the valve 52.

The passages 72 are circumferentially equally spaced at 120° with respect to one another and, being only three in number, do not materially reduce or weaken the cross section of the lower end of the valve 52.

During the assembly procedure for the valve 52 seen according to Figure 6, the soft copper disk 56 for the valve 52 is positioned with the cylindrical stud 66a uppermost and is held securely in a socket formed in a stationary die 78. The hollow body piece 52 of the valve 52 is thereafter spaced over the disk 56 in axial engagement therewith such that the copper upstanding stud 66a protrudes inside the lower floor opening 68 and upwardly through the stud receiving socket 64. A vertically movable upsetting tool 80 operated as by an arbor press and having a shallow concave socket 82 in the lower end thereof is lowered within the hollow interior of the valve 52 and brought down under pressure against the upstanding stud 66a within the hollow interior 62 of the steel hollow body piece of the valve 52. The peening impact of the upsetting tool 80 causes the cylindrical stud 66a, Figure 6, to be foreshortened and flattened down into a rounded nose formation as at 66b conforming to and complementary with the shallow concave socket 82 in the lower end of the upsetting tool 80. Thereafter the tool 80 is vertically withdrawn in the arbor press and the integrated valve 52 may be lifted from the stationary die 78 with the accompanying copper seal disk 56 peened to and solidly carried by the lower end portion 54 of the hollow steel body piece.

As herein disclosed, the instant bipartite cylinder relief valve is shown embodied in the cylinder heads of a 90° V-8 diesel engine. It is evident that the bipartite relief valve is equally well adaptable to diesel engines of other constructions or numbers or arrangements of cylinders, and in fact adaptable to most any internal combustion engine in which a compression relieving starting valve is desirable. So also the drawing shows the peenable integrating stud formed en bloc with the sealing disk 56 but self-evidently the stud may be integrally formed on the lower end of the hollow body piece of the valve 52 and received in an appropriate opening formed in the copper sealing disk and peened over with respect thereto. According to the disclosure the valve 52 is adjusted by means of a hexagonally shaped bent bar or tool known as an Allen wrench which is received in a complementary internal socket at the upper end of the valve 52 but indeed it is not essential to the invention that a strict hexagonal socket be used and any convenient complementary polygonally shaped bar and socket may be employed on the respective members of which the tool member may take the form of a polygonal socket wrench and the upper, outer end of the valve member may be polygonally shaped externally to be received within the socket of the wrench member rather than vice versa as disclosed.

Variations within the spirit and scope of the invention described are equally comprehended by the foregoing description.

What is claimed is:

1. A bipartite valve including a hollow steel member of conically reduced diameter at one end portion thereof to define a conical socket in the interior and being externally threaded for reception in the threaded mouth of a passage, said hollow member having a tool receiving coaxial counter socket in the opposite end portion thereof, and a disk shaped copper member of a diameter of the order of the small diameter of the reduced end portion of the hollow member and axially engaged therewith, said disk shaped member incorporating a deformable stud protruding through an opening in the said reduced end of the hollow member adjacent said socket, there being a plurality of passage means in said reduced end portion of the hollow member conforming to a conical path of revolution and disposed such that the conically converging axes of the passage means form a common apex in the hollow interior of the hollow member behind and spaced apart from the stud on the disk like member.

2. A unitized valve element comprising a hollow sleeve of conically reduced diameter at one end portion thereof to define a conical recess in the interior, the extended apex of generation of the conical end portion being located at a point outside of the extremity of the hollow sleeve, said hollow sleeve having a tool receiving coaxial counter socket in the opposite end portion thereof, and a solid disk of a diameter of the order of the small diameter of the reduced end portion of the hollow sleeve and axially engaged therewith, said solid disk having a deformable stud protruding through an opening in the said reduced end of the hollow part at the bottom of the conical socket, a plurality of passage means formed in said reduced end portion of the hollow sleeve conforming to a conical path of revolution and disposed such that the axes of the passage means have a conical apex of convergence in a different direction from the convergence of the aforesaid apex of convergence of the conical end portion of the hollow sleeve.

3. A pressure relieving valve and a body having a pressure bleed passage, said passage having a threaded mouth and said valve having an access opening therethrough and registering with said mouth, said valve comprising a hollow body part of reduced diameter at one end portion and being externally threaded for reception flush within the threaded mouth of the bleed passage, said hollow body part having a tool-receiving coaxial socket in the opposite end portion thereof, a metallic gasket part of a diameter of the order of the small diameter of the reduced end portion of the hollow body part and axially engaged therewith, said gasket part having a deformable stud protruding through an opening in the said reduced end portion of the hollow part and affixed thereto, a plurality of passages in said reduced end portion of the hollow body part, and said passages being spaced apart from the gasket part.

4. A bipartite valve including a hollow hard metallic member of conically reduced diameter at one end portion thereof to define a conical socket in the interior and being externally threaded for reception in the threaded mouth of a passage, said hollow member having a tool-receiving coaxial countersocket in the opposite end portion thereof, and a disk shaped soft metallic member of a diameter of the order of the small diameter of the reduced end portion of the hollow member and axially engaged therewith, said disk shaped member incorporating a deformable stud protruding through an opening in the said reduced end of the hollow member adjacent said socket, there being a plurality of passage means in said reduced end portion of the hollow member conforming to a conical path of revolution and disposed such that the conically converging axes of the passage means form a common apex in the hollow interior of the hollow member behind and spaced apart from the stud on the disk-like member.

References Cited in the file of this patent

UNITED STATES PATENTS

| | | |
|---|---|---|
| 318,479 | Kells | May 26, 1885 |
| 476,957 | Hale | June 14, 1892 |
| 1,238,221 | Tibbetts | Aug. 28, 1917 |
| 1,276,325 | Carling | Aug. 20, 1918 |
| 1,400,488 | Langrebe | Dec. 31, 1921 |
| 1,678,927 | Weatherhead | July 31, 1928 |
| 1,890,584 | Nardin | Dec. 13, 1932 |
| 2,369,669 | Garand | Feb. 20, 1945 |
| 2,748,798 | Withrow | June 5, 1956 |

FOREIGN PATENTS

| | | |
|---|---|---|
| 12,684 | Switzerland | of 1896 |
| 18,869 | Switzerland | of 1899 |
| 480,609 | France | of 1916 |
| 20,164 | France | of 1917 |